United States Patent [19]

Kaetsu et al.

[11] Patent Number: 4,839,109

[45] Date of Patent: Jun. 13, 1989

[54] PROCESS FOR PRODUCING A CONTACT LENS

[75] Inventors: Isao Kaetsu; Minoru Kumakura, both of Gunma; Hidenari Suyama, Kanagawa; Nobuo Kameda, Tokyo; Hideo Kôyama, Saitama, all of Japan

[73] Assignees: Japan Atomic Energy Research Institute; Tokyo Contact Lens Research Institute, both of Tokyo, Japan

[21] Appl. No.: 886,266

[22] Filed: Jul. 16, 1986

[30] Foreign Application Priority Data

Jul. 19, 1985 [JP] Japan .................. 60-158072

[51] Int. Cl.$^4$ .............. B29D 11/00; C08F 230/08; C08F 220/18
[52] U.S. Cl. .................... 264/1.4; 522/5; 522/99; 526/264; 526/279
[58] Field of Search ........... 522/99, 5; 526/279, 526/264; 264/1.4

[56] References Cited

U.S. PATENT DOCUMENTS

| | | | |
|---|---|---|---|
| 3,916,033 | 10/1975 | Merrill | 522/99 |
| 3,983,083 | 9/1976 | Kaetsu | 264/1.4 |
| 4,120,570 | 10/1978 | Gaylord | 526/279 |
| 4,138,300 | 2/1979 | Kaetsu | 522/5 |
| 4,248,989 | 2/1981 | Novicky | 526/264 |
| 4,306,042 | 12/1981 | Neefe | 522/99 |
| 4,330,383 | 5/1982 | Ellis et al. | 522/99 |

Primary Examiner—John C. Bleutge
Assistant Examiner—R. Dean Jr.
Attorney, Agent, or Firm—Browdy and Neimark

[57] ABSTRACT

A mixture of a specified siloxanylalkyl ester monomer and a specified vinyl monomer is polymerized by exposure to an ionizing radiation at low temperatures and the resulting polymer is worked with a lathe cut to form a contact lens. The contact lens obtained is free from any optical distortion, has good dimensional stability and exhibits high oxygen permeability. In a preferred embodiment, a monomer mixture comprising a siloxanylalkyl ester, a methacrylate or acrylate, N-vinylpyrrolidone, and a small amount of a dimethacrylate or diacrylate is exposed to a total dose of $1 \times 10^5$–$5 \times 10^6$ roentgens at a low temperature ($-80°$ C. to $-20°$ C. and at a dose rate of $8 \times 10^4$–$2 \times 10^6$ roentgens per hour, and the resulting polymer is worked into a contact lens by a suitable forming process involving cutting, grinding and polishing operations.

3 Claims, No Drawings

PROCESS FOR PRODUCING A CONTACT LENS

BACKGROUND OF THE INVENTION

The present invention relates to a process for producing a contact lens and, more particularly, to a process for producing a hard contact lens that has good dimensional stability and high oxygen permeability and which can be worn for a prolonged period.

The use of contact lenses has expanded at rapid rates because of the many advantages they have over conventional spectacles, such as lightness, unobtrusiveness in the wearer's activity, good aesthetic appeal, and sufficiently good fit to the cornea to ensure a wide corrected field of vision. Most of the hard contact lenses available today are formed of plastic materials. Since the principal component of hard contact lenses is a methyl methacrylate polymer, they have good optical performance but they provide for such a low degree of oxygen permeability that they will cause problems such as spectacles blur and corneal edema if they are worn longer than the indicated period. In addition, the "hard" contact lenses do not have high affinity for the cornea and will often cause excessive tear flow or discomfort to the wearer.

In order to eliminate these problems of hard contact lenses, soft contact lenses that are based on hydrophilic hydroxyethyl methacrylate polymers have been developed. Compared with hard contact lenses based on methyl methacrylate polymers, soft contact lenses cause less discomfort to the wearer, have good affinity for the cornea and exhibit improved oxygen permeability. However, hydrated soft contact lenses are easily contaminated by bacteria and must be disinfected by boiling at least once a day. In addition to this cumbersomeness in use, soft contact lenses do not have sufficient mechanical strength to warrant their use for many years. Furthermore, even if the cornea of the wearer is damaged by the contact lens, he will not be aware of the damage until it has caused a serious problem.

Silicone rubber is one of the plastic materials that have the highest degree of oxygen permeability, and increasing attention is being paid to the fabrication of contact lenses from silicone rubber. These new types of soft contact lenses are still disadvantageous in that they have to be formed by a casting process and that they are hydrophobic and do not have high affinity for the eye. Under these circumstances, efforts are being made to produce contact lenses from siloxanyalkyl ester monomers.

The siloxanyalkyl ester monomers that are usable as materials from which contact lenses can be formed are their esters with acrylic or methacrylic acid (Japanese Patent Public Disclosure No. 132725/1983). However, these vinyl monomers are not highly polymerizable and active efforts are being made in order to maximize their polymerization by adding large amounts of other polymerizable vinyl monomers, but it still has been very difficult to prepare polymers having no residual unreacted monomers. Unreacted monomers which remain in a contact lens may cause inflammations in the cornea of the wearer and their content must be lowered to a minimum level. This requirement could be met by performing thermal polymerization in the presence of a catalyst but the amount of the catalyst that can be used is limited because if it is used in a large amount, it will be decomposed in the early period of polymerization and tiny pieces of the decomposed catalyst will remain in the product contact lens. The residual catalyst fragments are also highly deleterious to the dimensional stability of the contact lens. Therefore, in the production of contact lenses by catalyst-aided thermal polymerization of siloxanyalkyl ester monomers, the elimination of any unreacted monomers and decomposed catalyst chips is important not only from a medical viewpoint but also for the purpose of attaining good lens performance.

If a mixture of multiple monomer components having different degrees of polymerizability is subjected to thermal polymerization by the static method, the difference in the rates of polymerization of the individual components will cause bubbles in the polymer or lead to the production of a shrunken polymer.

Another problem that has been encountered in the prior art is that a polymer with decreased oxygen permeability results if prolonged reaction is performed with a view to attaining a desired polymer hardness.

SUMMARY OF THE INVENTION

The principal object, therefore, of the present invention is to eliminate the aforementioned problems from the use of siloxanyalkyl ester monomers as the materials for production of contact lenses and to provide a process for producing a transparent contact lens that is free from any optical distortion and has good dimensional stability and which yet exhibits improved oxygen permeability.

According to the process of the present invention, a monomer mixture containing a specified siloxanyalkyl ester monomer and a specified vinyl monomer is polymerized by exposure to an ionizing radiation under low temperature conditions, and the resulting polymer is formed into a contact lens by working on a lathe cut. By this process, not only can the aforementioned object of the present invention be attained but also the polymerization of the monomer mixture can be completed within a short period of time. In addition, the produced contact lens has superior performance.

The process of the present invention for producing a contact lens comprises a step wherein a monomer mixture containing a siloxanyalkyl ester monomer selected from Group I shown below and a vinyl monomer selected from Group II or III shown below is polymerized by exposure to an ionizing radiation at a temperature between −100° C. and 0° C., and a step wehrein the resulting polymer is formed into a contact lens by working on a lathe:

[Group I]
a siloxanyalkyl methacryalte or acrylate monomer represented by the following general formula:

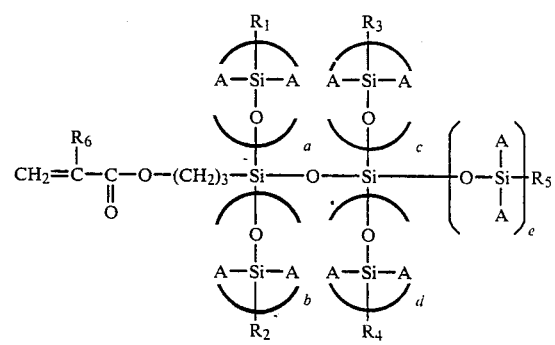

(where A, $R_1$, $R_2$, $R_3$, $R_4$ and $R_5$ are each a methyl or phenyl group; $R_6$ is a hydrogen atom or a methyl group; a and b are each an integer of 0 to 3; c and d are each an integer of 0 to 2; and e is 0 or 1);

[Group 2]

a methacryalte or acryalte monomer represented by the following formula:

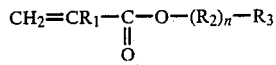

(where $R_1$ is a hydrogen atom or a methyl group; $R_2$ is a methylene or oxymethylene unit; $R_3$ is one member selected from the group consisting of methyl, ethyl, propyl, cyclohexyl, phenyl, fluorine-containing alkyl and fluorine-containing aryl groups; and n is an integer of 0 to 14);

[Group 3]

a compound represented by the following general formula, or N-vinylpyrrolidone:

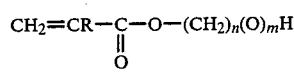

(where R is a hydrogen atom or a methyl group; n is an integer of 0 to 14; and m is 0 when n is 0 and 1 when n is more than 0).

DETAILED DESCRIPTION OF THE INVENTION

Several studies have been made on the preparation of contact lenses from siloxanylalkyl ester monomers. The siloxanylalkyl ester monomers of Group I used in the present invention are very high in polymerizability. In addition, they contain a large amount of silicon in their molecule and enable the production of a polymer having an incomparably high degree of oxygen permeability. Specific examples of the siloxanyalkyl ester monomers of Group I that may be used in the present invention include 3-methacryloxypropyl tris(trimethylsiloxy)silane and 3-methacryloxypropyl bis(trimethylsiloxy)methylsilane.

The vinyl monomers of Group II are added for the purpose of adjusting the mechanical strength and optical properties of contact lenses. Specific examples of the vinyl monomers of Group II thay may be used in the present invention include methyl acrylate, ethyl acrylate, cyclohexyl acrylate, benzyl acrylate, methyl methacrylate, ethyl methacrylate, butyl methacryalte, cyclohexyl methacrylate, benzyl methacrylate, trifluoroethyl methacrylate, and pentafluorophenyl methacrylate.

The vinyl monomers of Group III are used to adjust the wettability of contact lenses, and specific examples of the vinyl monomers of Group III include acrylic acid, hydroxyethyl acrylate, hydroxypropyl acrylate, butanediol acrylate, methoxyethylene glycol acrylate, methacrylic acid, hydroxyethyl methacrylate, hydroxypropyl methacrylate, butanediol methacrylate, methoxyethylene glycol methacrylate, and N-vinylpyrrolidone.

The monomer mixture used in the present invention preferably contains 10-50 parts by weight of a compound of Group I, 20-60 parts by weight of a compound of Group II, and 5-40 parts by weight of a compound of Group III. If a compound of Group I is present in an amount of less than 10 parts by weight, a polymer having low oxygen permeability forms. If the compound of Group I is present in an amount of more than 50 parts by weight, a highly oxygen-permeable polymer will form but it has an undesirably low hardness to become rubbery. If a compound of Group II is present in an amount of less than 20 parts by weight, a rubbery polymer will result, which is too low in hardness to be formed into a desired contact lens. If the compound of Group II is present in an amount of more than 60 parts by weight, a polymer having improved optical peformance is obtained but its oxygen permeability is undesirably low. If a compound of Group III is present in an amount of less than 5 parts by weight, the resulting polymer is so poorly wettable with water that it is highly sensitive to staining. If the compound of Group III is present in an amount of more than 40 parts by weight, the chance of craze formation is increased. If the proportion of the compound of Group II or III relative to the compound of Group I is lower than the above-specified level, the polymerizability of the monomer mixture is reduced, which is not at all desirable for the purpose of carrying out polymerization at 0° C. or subzero temperatures.

The monomer mixture used in the present invention may optionally contain a crosslinking agent in order to meet the requirement for producing a contact lens having high dimensional stability. Typical polymerizing agents may be selected from the following Group IV:

[Group IV]

a crosslinking agent represented by the following general formula:

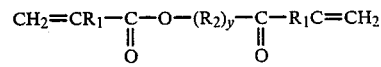

(where $R_1$ is a hydrogen atom or a methyl group; $R_2$ is one member selected from the group consisting of —$CH_2$—$CH_2$—O—,

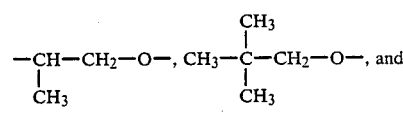

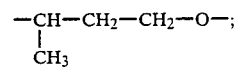

$R_3$ is one member selected from the group consisting of $CH_3$—, $CH_3CH_2$— and $CH_2OH$; and y is an integer of 1 to 14).

Illustrative crosslinking agents are diacrylates, dimethacrylates, triacrylates and trimethacrylates. More specific examples include: ethleneglycol diacrylate, ethyleneglycol dimethacrylate, tetraethyleneglycol diacrylate, tetraethyleneglycol dimethacrylate, propyleneglycol dimethacrylate, neopentylglycol diacrylate, hexanediol dimethacrylate, trimethylpropane triacrylate, and trimethylpropane trimethacrylate.

These crosslinking agents are preferably used in amounts ranging from 0.1 to 20 parts by weight, with the comounds of Groups I, II and III being present in the monomer mixture in the proportions defined above. If less than 0.1 part by weight of the crosslinking agent is used, the intended increase in polymer hardness is not attained. If more than 20 parts by weight of the crosslinking agent is used, the temperature of the monomer mixture being polymerized increases and a bubble-containing polymer will form.

The ionizing radiation that can be employed in the process of the present invention is not limited to any particular type and may be, for example, alpha-rays, gamma-rays, X-rays, an electron beam from an accelerator, a mixed radiation from a nuclear reactor which contains neutron radiation, or ultraviolet radiation. For high-dose exposure, gamma-rays from $Co^{60}$ are suitably used. The exposed dose of ionizing radiation will slightly vary with the composition of the monomer mixture to be irradiated and typically ranges from $1 \times 10^4$ to $5 \times 10^6$ roentgens, with the dose rate ranging from $8 \times 10^4$ to $2 \times 10^6$ roentgens/hr. The temperatures for irradiation should be within the range of $-100°$ C. to $0°$ C., preferably $-80°$ C. to $-20°$ C. If the temperature for irradiation is higher than $0°$ C., shrinkage occurs during polymerization and the resulting polymer will become smaller in volume than the initial monomer mixture. This causes not only a distortion in the polymer which leads to deteriorated optical characteristics but also lowered oxygen permeability. If the temperature for irradiation is lower than $-100°$ C., the components of the monomer mixture will crystallize to produce an opaque copolymer.

If desired, radiation-initiated polymerization may be followed by thermal polymerization.

The polymer prepared by the method of the present invention has an oxygen permeability of 5 to $83 \times 10^{11}$ $cm^3.2$,sec.mmHg, a refractive index ($n_D$) of 1.37-1.49, a specific gravity of 1.08-1.21, a visible light transmittance of 90% or more, and a Vickers hardness of 5.0-20.0. This polymer may be worked into a final contact lens by the standard forming process involving such steps as cutting, grinding and polishing.

The prior art catalytic polymerization process has required a reaction period of 50 hours or longer for producing a contact lens which is free from any optical distortion and which has a reduced level of residual unreacted monomer. In the process of the present invention which employs a monomer mixture containing the specified siloxanylalkyl ester monomer and the specified vinyl monomer, the reaction temperature is within the range of $-100°$ C. to $0°$ C. and in spite of this low temperature condition, polymerization can be completed by exposure to radiation for a period as short as about 30 minutes to 3 hours. In addition, radiation-initiated polymerization which is performed under this low-temperature condition is free from any shrinkage in the polymer but a contact lens which has no optical distortion but which exhibits good dimensional stability can be obtained by forming this polymer. Another advantage of employing the low-temperature condition is that the reaction period can be sufficiently extended to increase the polymer hardness without sacrificing its oxygen permeability, and a contact lens having superior oxygen permeability can be prepared from the obtained polymer.

The following examples are provided for the purpose of further illustrating the present invention but should in no sense be taken as limiting. In the following working examples and comparative examples, all "parts" are based on weight and the unit of oxygen permeability coefficient is $ml(O_2).cm/cm^2.sec.mmHg$.

EXAMPLE 1

A mixture of 3-methacryloxypropyl tris(trimethylsiloxy)silane (40 parts), methyl methacrylate (40 parts), methacrylic acid (10 parts) and ethyleneglycol diacrylate (2 parts) was charged into a reaction vessel (1.8 $cm^\phi \times 16$ cm) and polymerized by exposure to a total dose of $2 \times 10^6$ roentgens of gamma-rays from $Co^{60}$ at $-78°$ C. and at a dose rate of $1 \times 10^6$ roentgens per hour. A transparent copolymer formed. It was adaptive to the preparation of a hard contact lens and had a Vickers hardness of 14.0. Analysis by spectral absorption in the ultraviolet range showed that this polymer did not contain any residual unreacted monomer. The polymer was formed into a contact lens 0.1 mm thick, which was found to have an oxygen permeability coefficient of $25.1 \times 10^{-11}$.

EXAMPLE 2

A mixture of 3- methacryloxypropyl tris(trimethylsiloxy)silane (50 parts), hydroxethyl methacrylate (20 parts) and tetraethyleneglycol diacrylate (10 parts) was charged into a reaction vessel (1.8 $cm^\phi \times 16$ cm) and polymerized by exposure to a total dose of $1 \times 10^6$ roentgens of gamma-rays from $Co^{60}$ at $-24°$ C. and at a dose rate of $2 \times 10^6$ roentgens per hour. The resulting transparent copolymer had a Vickers hardness of 13.5. The content of residual unreacted monomer as measured by the method employed in Example 1 was zero. The polymer had an oxygen permeability coefficient of $40.5 \times 10^{-1}$.

EXAMPLE 3

A mixture of 3-methacryloxypropyl tris(trimethylsiloxy)silane (50 parts) and butanediol methacrylate (50 parts) was charged into a reaction vessel (1.8 $cm^\phi \times 16$ cm) and polymerized by exposure to a total dose of $3 \times 10^6$ roentgens of gamma-rays from $Co^{60}$ at $-45°$ C. and at a dose rate of $1 \times 10^6$ roentgens per hour. The resulting polymer was transparent and had a Vickers hardness of 12.0. The content of residual unreacted monomer ws measured by the same method as employed in Example 1 but it could not be detected. The polymer had an oxygen permeability coefficient of $80.0 \times 10^{-11}$.

EXAMPLE 4

A mixture of 3-methacryloxypropyl bis(trimethylsiloxy)ethylsilane (40 parts), methyl methacrylate (40 parts), methacrylic acid (14 parts), ethyleneglycol diacrylate (5 parts) and azobis-isobutyronitrile (0.1 part) was charged into a reaction vessel (1.8 $cm^\phi \times 16$ cm) and exposed to a total dóse of $1 \times 10^5$ roentgens of gamma-rays from $Co^6$ at $-73°$ C. and at a dose rate of $1 \times 10^5$ roentgens per hour. Thereafter, the mixture was subjected to thermal polymerization at $90°$ C. for 48 hours. The resulting transparent polymer had a Vickers hardness of 15.0 and an oxygen permeability coefficient of $35.0 \times 10^{11}$.

COMPARATIVE EXAMPLE 1

A mixture of 3-methacryloxypropyl tris(trimethylsiloxy)silane (50 parts), methyl methacrylate (40 parts), methacrylic acid (5 parts) and ethyleneglycol dimethacrylate (2 parts) was charged into a reaction vessel (1.8 $cm^\phi \times 16$ cm) and polymerized by exposure to a total dose of $2 \times 10^6$ roentgens of gamma-rays from $Co^{60}$ at $-110°$ C. at a dose rate of $1 \times 10^6$ roentgens per hour. An opaque turbid polymer formed.

COMPARATIVE EXAMPLE 2

A mixture of 3-methacryloxypropyl tris(trimethylsiloxy)silane (40 parts), cyclohexyl methacrylate (40 parts), hydroxethyl methacrylate (10 parts) and ethyleneglycol diacrylate (2 parts) was charged into a reaction vessel (1.8 cm$^\phi \times$16 cm) and polymerized by exposure to a total dose of $1 \times 10^6$ roentgens of gamma-rays from Co$^{60}$ at 20° C. and at a dose rate of $2 \times 10^6$ roentgens per hour. A transparent polymer formed. It had a Vickers hardness of 13.8. The content of residual unreacted monomer was measured as in Example 1 but it was undetectable. The polymer had an oxygen permeability coefficient of $43.5 \times 10^{11}$.

In each of Examples 1 to 4, the level of the polymer formed in the reaction vessel was only about 5 mm below the initial level of the monomer mixture, and the obtained polymer had negligible optical distortion. In Comparative Example 2, shrinkage occurred during polymerization and the center of the polymer in the reaction vessel sank by more than 1 cm and the obtained polymer had to be annealed in order to eliminate the introduced optical distortion.

COMPARATIVE EXAMPLE 3

Polymerization was carried out as in Comparative Example 2 except that the monomer mixture further contained 0.08 parts of azobisisobutyronitrile and was subjected to thermal polymerization at 55° C. for 48 hours. Shrinkage occurred during polymerization and the center of the polymer in the reaction vessel sank by more than 2 cm. The polymer obtained has a Vickers hardness of 13.0. A trace amount of residual unreacted monomer was detected by the same method as employed in Example 1. The polymer obtained had an oxygen permeability coefficient of $35.0 \times 10^{11}$.

What is claimed is:

1. A process for producing a contact lens comprising the steps of:
    polymerizing a monomer mixture containing a siloxanylalkyl ester monomer within Group I shown below, a vinyl monomer within Group II or Group III shown below in the presence of a crosslinking agent within Group IV shown below by exposure to gamma ray radiation at a temperature between $-100°$ C. and 0° C.;
    and forming resulting polymer into a contact lens by working on a lathe;
    said Groups I, II, III and IV being defined as follows:
    Group I:
    a siloxanylalkyl methacrylate or acrylate monomer represented by the following general formula:

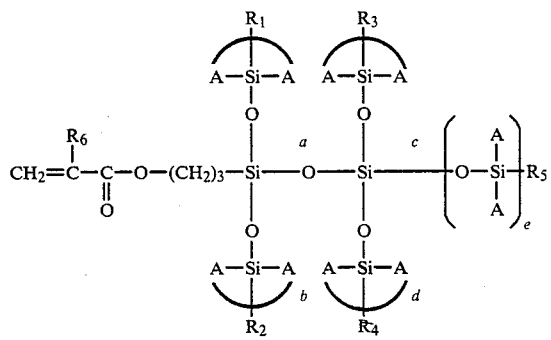

where A, $R_1$, $R_2$, $R_3$, $R_4$, and $R_5$ are each a methyl or phenyl group; $R_6$ is a hydrogen atom or a methyl group; a and b are each an integer of 0 to 3; c and d are each an integer of 0 to 2; and e is 0 or 1;
    Group II:
    a methacrylate or acrylate monomer represented by the following formula:

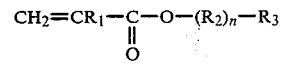

where $R_1$ is a hydrogen atom or a methyl group; $R_2$ is a methylene or oxymethylene unit; $R_3$ is one member selected from the group consisting of methyl, ethyl, propyl, cyclohexyl, phenyl, fluorine-containing alkyl and fluorine-containing aryl groups; and n is an integer of 0 to 14;
    Group III:
    a compound represented by the following formula, or N-vinylpyrrolidone:

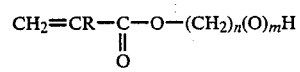

where R is a hydrogen atom or a methyl group; and n is an integer of 0 to 14, an m is 0 when n is 0 and 1 when n is more than 1; and
    Group IV:
    a crosslinking agent represented by the following formula:

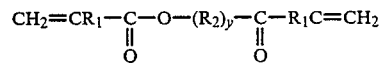

or

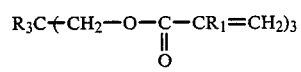

where $R_1$ is a hydrogen atom or a methyl group; $R_2$ is one member selected from the group consisting of —CH$_2$—CH$_2$—O—,

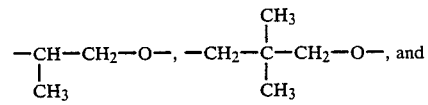

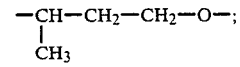

$R_3$ is one member selected from the group consisting of CH$_3$—, CH$_3$CH$_2$— and -CH$_2$OH; and y is an integer of 1 to 14.

2. A process according to claim 1 wherein the monomer mixture comprises 10–50 parts by weight of a compound of Group I, 20–60 parts by weight of a compound of Group II or 5–40 parts by weight of a compound of Group III.

3. A process according to claim 1 wherein the monomer mixture contains 10–50 parts by weight of a compound of Group I, 20–60 parts by weight of a compound of Group II or 5–40 parts by weight of a compound of Group III, and 0.1–20 parts by weight of a compound of Group IV.

* * * * *